United States Patent [19]

Araya et al.

[11] 4,205,217
[45] May 27, 1980

[54] AUTOMATIC WELD LINE COPYING APPARATUS

[75] Inventors: Takeshi Araya, Shimoinayoshi; Tsugio Udagawa, Tomobemachi, both of Japan

[73] Assignees: Hitachi, Ltd.; Hitachi Seiko Ltd., both of Japan

[21] Appl. No.: 755,427

[22] Filed: Dec. 29, 1976

[51] Int. Cl.² .............................................. B23K 9/12
[52] U.S. Cl. ................................ 219/124.34; 318/657; 336/179
[58] Field of Search ............. 219/124, 125 R, 125 PL, 219/124.1, 124.22, 124.34; 318/647, 653, 654, 655, 656, 657, 658, 659, 660, 661; 324/34 PS, 34 D; 336/179

[56] References Cited

U.S. PATENT DOCUMENTS

| 3,308,411 | 3/1967 | Roshala | 336/179 |
| 3,371,272 | 2/1968 | Stanton | 219/125 PL |
| 3,430,134 | 2/1969 | Flaherty et al. | 219/125 R |
| 3,588,660 | 6/1971 | Purkhiser | 219/125 PL |
| 3,609,527 | 9/1971 | Ellis | 324/34 D |
| 3,626,283 | 12/1971 | James et al. | 318/657 |
| 3,684,961 | 8/1972 | Muir | 318/653 |
| 3,694,785 | 9/1972 | Chass | 336/179 |
| 3,750,010 | 7/1973 | Abnett et al. | 336/179 |
| 3,833,788 | 9/1974 | Hovance et al. | 219/125 PL |
| 3,962,919 | 6/1976 | Playfoot et al. | 336/179 |

FOREIGN PATENT DOCUMENTS

| 39-12765 | 7/1964 | Japan | 219/125 R |
| 270257 | 11/1966 | U.S.S.R. | 336/179 |

Primary Examiner—B. A. Reynolds
Assistant Examiner—Clifford A. Shaw
Attorney, Agent, or Firm—Craig and Antonelli

[57] ABSTRACT

An automatic weld line copying apparatus has a non-contact type sensor including a core wound with an exciting primary winding which in turn is wound with a secondary winding a plurality of secondary coils differentially. The sensor is compact and able to detect, without contact, the distance from the flat surface or edge line of an object to be welded thus making possible accurate and efficient automatic welding of a small welding assembly with a complicated weld line.

5 Claims, 8 Drawing Figures

AUTOMATIC WELD LINE COPYING APPARATUS

BACKGROUND OF THE INVENTION

1. FIELD OF THE INVENTION

This invention relates to an automatic weld line copying apparatus useful for a welding operation automatically copying a weld line.

2. DESCRIPTION OF THE PRIOR ART

A conventional sensor of differential transformer type used with an automatic copying apparatus is shown in FIG. 1. A primary coil 3 is wound around a bobbin 2, a movable core 1 is mounted movably inside the bobbin, and a secondary winding including coils 4 and 5 which are wound differentially on both sides of the primary coil 3. When a probe 1a provided on the core 1 is moved, while its end point is held in mechanical contact with a material to be detected 6, an output voltage produced in the secondary winding is proportional to the movement of the core 1 relative to the coils. This type of sensor is used in an automatic copying apparatus of contact type.

Another conventional automatic copying apparatus is of non-contact type provided with a sensor which detects the distance from the base metal by utilizing the unbalance of magnetic fluxes caused by the proximity of the metal to the end surface of a fixed core 1.

In the case of the former automatic contact type copying apparatus, the copying surface must be smooth to eliminate the effect of spatter, scale, tack welding, flaw or magnetic flux on the base metal, thus limiting the applications thereof. Further, it is so bulky that it measures 20 mm in outside diameter and 50 mm in length.

In the latter apparatus of non-contact type, the sensor detection characteristics are such that at the area of relatively large distance from the base metal surface to the sensor, the output voltage V (r.m.s; effective value) is substantially constant, as shown by curve A in FIG. 2, thus making detection impossible. Further, when the sensor temperature increases, the relative position between the bobbin and the core changes, resulting in erroneous change of the output voltage of the secondary coils 4 and 5, and also the detection is readily affected by magnetic noise due to welding current.

SUMMARY OF THE INVENTION

Accordingly, an object of the present invention is to provide an automatic weld line copying apparatus with a small high-performance non-contact type sensor capable of performing automatic profile welding operation in a stable manner, and substantially free from undesired affection by preheating, arc heat, spatter on the copying surface or magnetic flux in submerged arc welding.

According to the present invention, there is provided an automatic weld line copying apparatus comprising a welding head, a non-contact type sensor including a primary winding wound on a fixed core and a secondary winding including a plurality of secondary coils wound in overlying relation on the primary coil and differentially with each other, the sensor being mounted to the welding head such that the sensor is held in non-contact with the base metal to be welded during the welding process, means for detecting the output voltage of the sensor, means for moving the welding head and sensor in such a manner as to fix the output voltage of the sensor at a predetermined value, thereby maintaining the distance between the sensor and the base metal constant.

DESCRIPTION OF THE PREFERRED EMBODIMENTS

Figure 3:
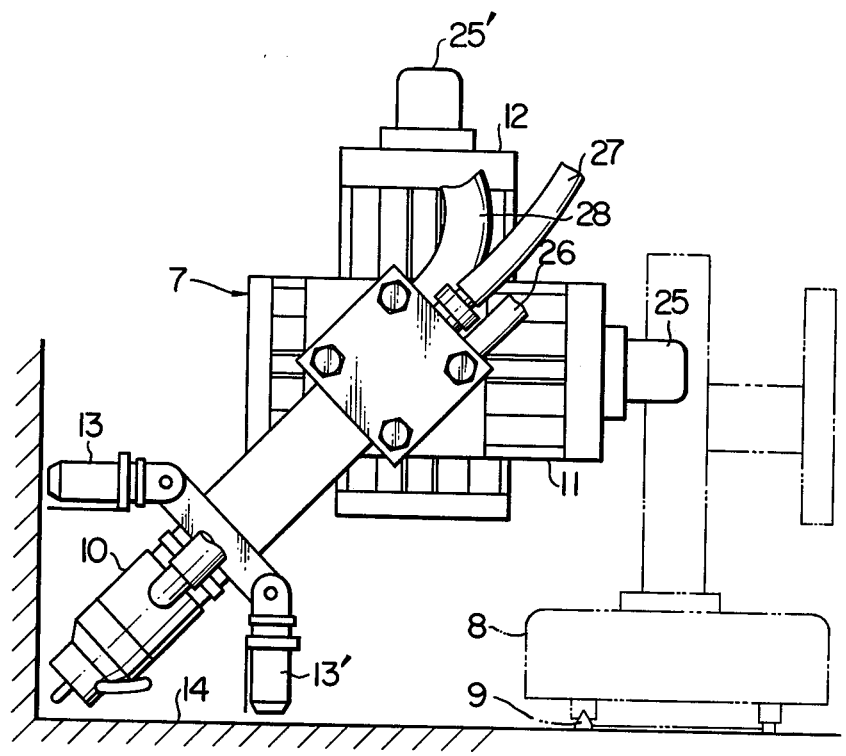
FIG. 3 shows the automatic weld line copying apparatus according to the present invention.

An embodiment of the present invention will be described with reference to FIGS. 3 to 8. In FIG. 3, a movable table 7 is mounted on a carriage 8 which is movable along the rails 9. The movable table 7 includes a horizontal table 11 on which a welding head 10 is mounted movably in a horizontal direction and a vertical table 12 on which the horizontal table 11 is movable in a vertical direction. Non-contact type sensors 13 and 13', each having a coil mounting portion of 11 mm in outside diameter and 19 mm long, are mounted on the welding head 10. The sensors are adjustable in position so as to set their end points at a predetermined distance from a base metal 14 to be welded prior to starting of the welding operation.

Figure 4:
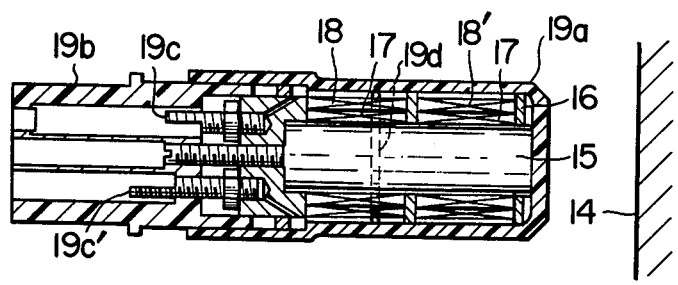
FIG. 4 is a sectional view of a sensor used with the automatic weld line copying apparatus according to the present invention.

As shown in FIG. 4, each of the sensors 13 and 13' comprises a fixed core 15, a primary winding including two primary coils 17 wound directly on (substantially directly over) the fixed core 1 and spaced from each other by a spacer 16, a secondary winding including secondary coils 18 and 18' wound on the primary coils, respectively. The coils of the primary winding are wound so as to produce magnetic fluxes additively to each other when energized, while the coils of the secondary winding are wound differentially, i.e. the induced voltages in response to the magnetic fluxes produced by the primary winding are opposite in polarity to each other. Each of the primary coils have, for example, 800 turns of heat-resistant enamel insulated wire and each of the secondary coils 650 turns of heat-resistance enamel insulated wire. Covers 19a and 19b, each made of resin, are removably mounted to cover the body of the sensor. Terminals 19c and 19c' are provided to electrically connect the primary and secondary coils with an AC transmitter 19 and an amplifier, respectively. A conductor ring 19d having one or more turns of conductor is provided to adjust the output voltage of the secondary winding. In the absence of any metal in proximity of the end of the core 15, i.e. when the sensor is located far from the base metal 14, the balance of magnetic fluxes is maintained between the coils 18 and 18' and therefore no output should be produced from the secondary winding including the coils 18 and 18'. On the other hand, as a metal exists in proximity to the end of the core 15, i.e. when the base metal 14 comes near to the sensor, the magnetic fluxes lose their balance between the coils 18 and 18', thereby causing the secondary winding to produce an output. Thus, as the distance between the sensor and the metal increases gradually, the output of the secondary winding should decrease gradually to zero. Actually, however, if the conductor ring 16 were omitted, the output of the secondary winding could decrease to zero, when the distance between the sensor and the metal reaches a certain value and again slightly increase as the distance further increases, due to the conditions produced in winding of the coils and other various factors. By inserting the conductor ring 19d and adjusting the location thereof, it is possible to eliminate such an undesired phenomenon and obtain a desired distance-to-output characteristic of the sensor such that the output voltage of the secondary winding decreases gradually to zero with increase of the distance between the sensor and the base metal.

Turning back to FIG. 3, a shield gas tube 26, a wire liner 27 and a power cable 28 are mounted at the rear end of the welding head 10. Although FIG. 3 shows the case of fillet welding, the sensors 13 and 13', which are capable of detecting the distance from the edge line of the base metal, are also applicable to other welding processes including butt welding, lap-joint welding, edge welding and built-up welding. Further, the invention has been described on the case shown in FIG. 3 where the movements in horizontal and vertical directions are controlled at the same time. However, it will be understood that when it requires the control in only one direction, one of the sensors 13 and 13' may be omitted and on the other hand when it requires additionally the detection of the gradient of the welding direction, an additional sensor may be required.

Figure 1:
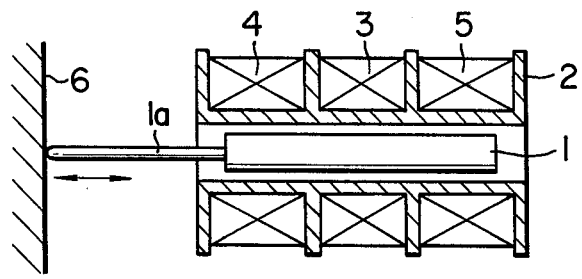
FIG. 1 is a schematic diagram showing a contact type sensor used with a conventional automatic weld line copying apparatus.
Figure 2:
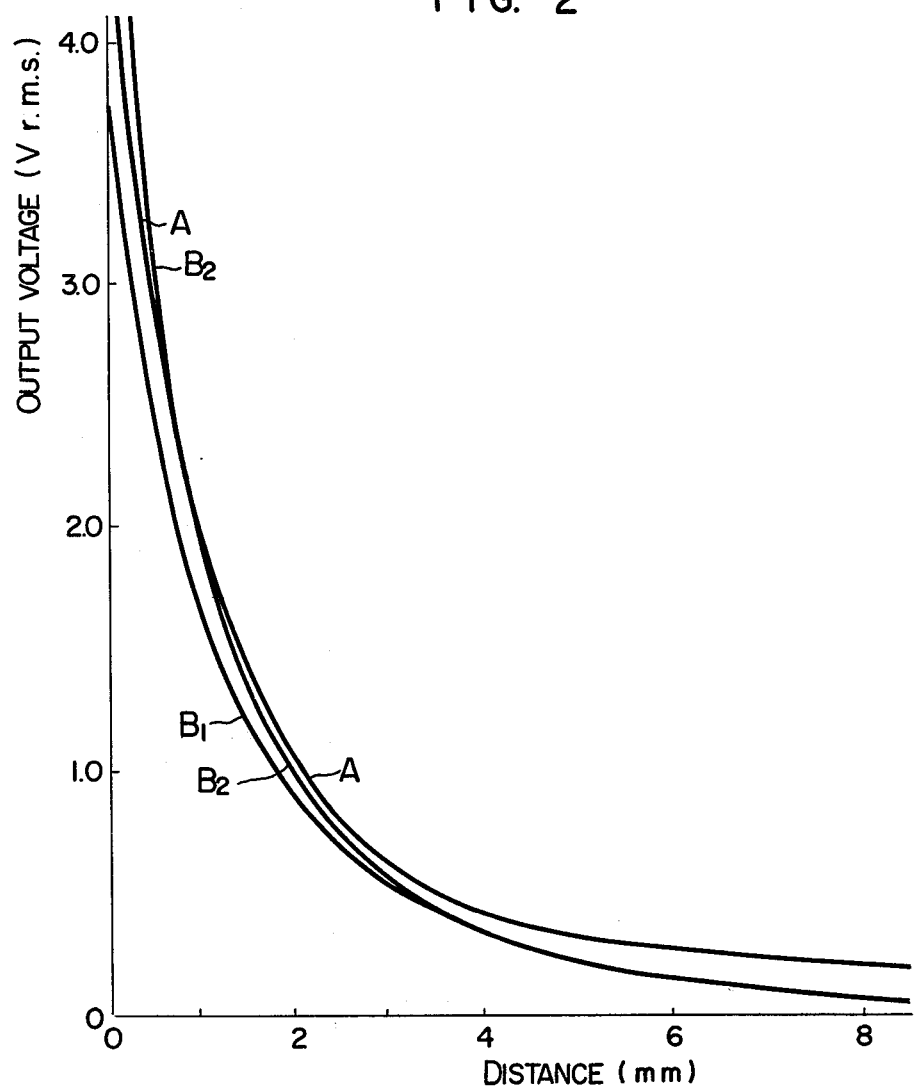
FIG. 2 is a diagram showing the relation between the displacement of the sensor from a base metal and the output voltage of the sensor.
Figure 5:
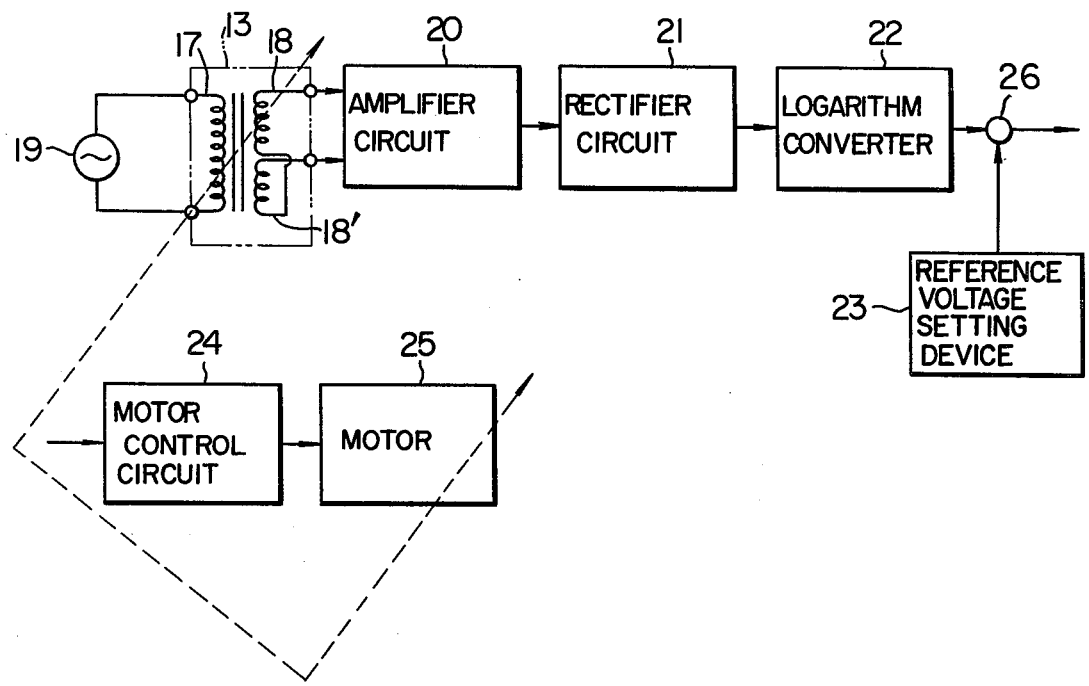
FIG. 5 is an electric circuit diagram of the automatic weld line copying apparatus according to the present invention.

An example of electric circuit used for this type of non-contact type sensor will be explained with reference to FIG. 5. The primary winding 17 of the sensor 13 is connected to the AC transmitter circuit 19. The output of the secondary winding corresponding to the differential output of the secondary coils 17 and 18 is connected to an amplifier circuit 20 for approximately 20-fold amplification. A rectifier circuit 21 is provided for converting the output amplified by the amplifier circuit 20 into a direct current. The output of the rectifier circuit 21 assumes a logarithmic curve as shown by curves $B_1$ and $B_2$ in FIG. 2 and therefore is transformed into a linear output characteristic through a logarithm converter circuit 22. The reference voltage setting device 23 is for setting a reference voltage which is predetermined according to the desired distance between the sensor and the base metal. The error signal, i.e. the difference between the outputs of the logarithm converter circuit 22 and the reference voltage setting device 23 is produced at an adder 26 and applied to the motor control circuit 24 thereby to drive the motor 25 of the movable table 11, so that the welding head, together with the sensor, moves towards or away from the base metal, until the distance therebetween becomes equal to the desired distance. Of course, the same circuit is also provided for the sensor 13' and operates in a similar manner.

The working using the apparatus according to the invention will be explained below.

With the welding head 10 set at predetermined position relative to the base metal 14, the non-contact type sensors 13 and 13' mounted on the welding head 10 are set at predetermined distance from the base metal 14, and then the welding process is started.

When the distance between base metal 14 and any one of the sensors 13 and 13' is maintained at its set value, as the sensors 13 and 13' move with the welding head 10, the output of any one of the sensors 13 and 13' is equal to the reference voltage so that no error signal is produced from the adder 26. As a result, no output is applied to the motor 25, so that the table 11 remains motionless and the welding head 10 continues to move.

Next, in the event that the surface of the base metal 14 comes nearer to the sensor 13 or 13' than the predetermined distance due to, for example, a thermal strain or other causes, an error occurs between the outputs of the sensor 13 or 13' and the reference voltage setting device 23, so that the motor 25 or 25' is driven through the motor control circuit 24 in such a way that the table 11 or 12 moves so as to move the welding head, together with the sensor 13 or 13' away from the base metal surface, until the sensor 13 or 13' comes to the predetermined distance from the base metal surface.

If the base metal surface moves farther from the sensor 13 or 13' than the predetermined distance, on the other hand, the motor 25 or 25' is driven in such a way as to cause the table 11 or 12 and hence the welding head together with the sensor 13 or 13' to approach the base metal surface.

In view of the likelihood of the hunting phenomenon during the movement of the table 11 in response to the error output, there is provided with a non-sensitive range at small values of the error output in which the table 11 is not moved.

Figure 6:
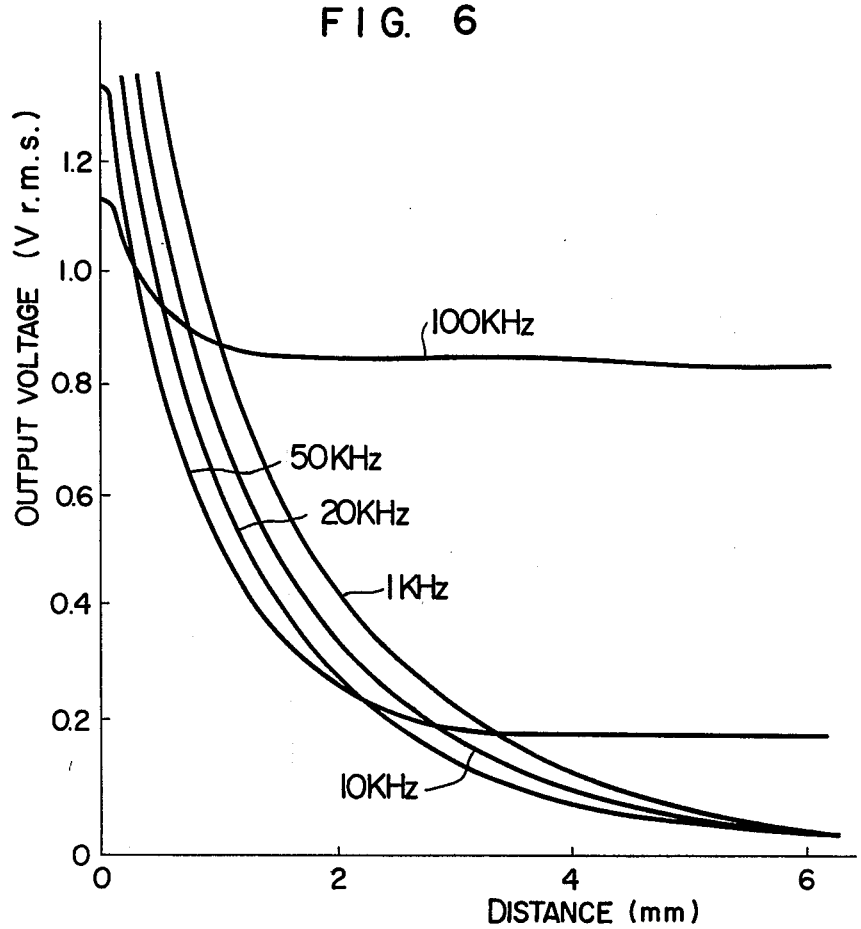
FIG. 6 shows characteristics of the sensor in relation between the distance of the sensor from a base metal and the output voltage thereof with different frequencies applied thereto.

The AC transmitter circuit 19 on the primary winding side may be one having a constant-voltage characteristic. However, the circuit generally exhibits a high impedance when its output voltage is relatively high and hence the output of the sensor gives a characteristic as shown by the curve $B_1$ in FIG. 2. Therefore, the AC transmitter circuit 19 is preferred to have a constant-current characteristic so that the output voltage of the sensor is high as shown by curve $B_2$ in FIG. 2, resulting in a higher sensitivity of distance detection. Further, if the frequency of the AC transmitter circuit 19 is higher than 50 KHz as shown in FIG. 6, detection is possible only for the distance of less than 3 mm. If it is desired to separate the sensor from the base metal by a distance of more than 6 mm, it is required to make the frequency of the circuit 19 lower than 20 KHz.

Figure 7:
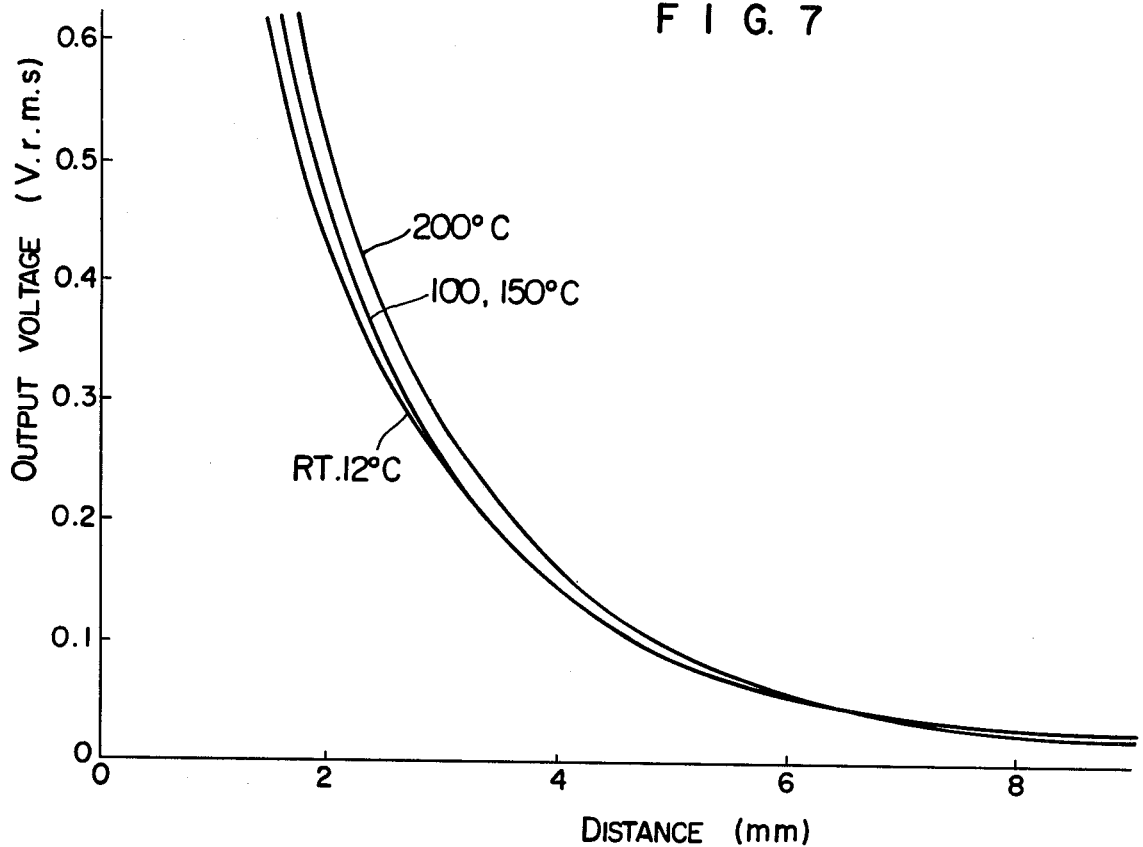
FIG. 7 shows temperature characteristics of the sensor.

In the non-contact type sensor used with the automatic weld line copying apparatus according to the present invention, the output of the sensor, at a distance of 6 mm between the sensor and base metal, does not change more than about 5% with the temperature increase from room temperature (12° C.) to 200° C. as shown in FIG. 7. This is due to the primary coils being wound directly or closely on the core without a bobbin therebetween and the secondary coils being wound directly on the primary coils. With this arrangement, the primary coils are hardly displaced due to temperature rise of the sensor and even with a slight displacement of the primary coils, the relative position between the secondary coils and the primary coils is substantially not changed. In the conventional sensor, as mentioned hereinbefore, the primary coil easily changes its relative position to the core due to difference in thermal expansion coefficient between the primary coil and the bobbin and also the displacement of the primary coil relative to the secondary coils by heat is very great.

Figure 8:
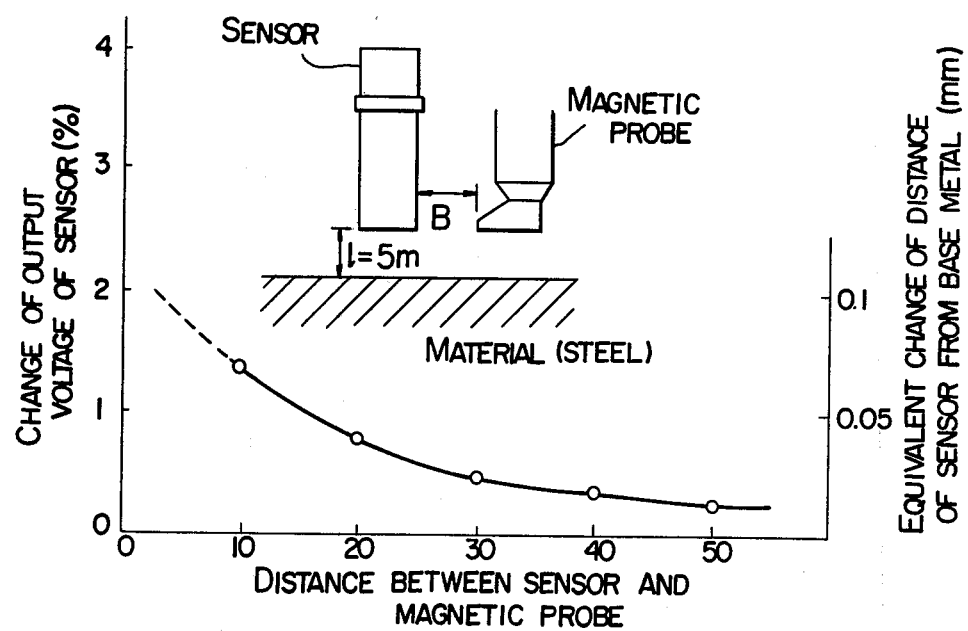
FIG. 8 shows characteristics of the sensor with respect to magnetic noise.

FIG. 8 shows change of the output of the sensor with change of the ambient magnetic field. The characteristic curve is obtained by measuring the output voltage of the sensor which is located at a distance of 5 mm from the end of the sensor to the base metal as changing the distance between the sensor and a magnetic probe which produces alternate magnetic fluxes whose density is 360–470 gausses at 5 mm from the end point thereof. In the figure, the ordinate indicates the change of the output voltage of the sensor in % scale shown in the left-hand side. The mm scale shown in the right-hand indicates the corresponding change in distance of the sensor position from the base metal. As seen from the figure, the output voltage of the sensor is hardly affected by the ambient magnetic fluxes, because the sensor is of a small size and its secondary coils are wound in differential mode so that the outputs thereof are summed subtractively.

It will be understood from the foregoing description that the automatic weld line copying apparatus according to the present invention, comprising sensors hardly affected by heat or great change of ambient magnetic field, is capable of welding accurately free from the influence of preheating, arc heat, or ambient magnetic field.

Further, the absence of a movable core and a bobbin makes the sensor so compact that it is applicable to welding of even a small object. Furthermore, the detection of the welding surface with no contact of the sensor makes possible the welding operation without being affected by spatter or dust attached to the welding surface.

We claim:

1. An automatic weld line copying apparatus comprising:
    a welding head;
    at least one sensor means including a fixed core, primary winding means wound around said core and excited with a signal having a desired current characteristic, and secondary winding means including a plurality of secondary coils differentially wound substantially directly over the outer circumference of said primary winding means, said sensor means being mounted on said welding head such that said sensor means is spaced from a base metal to be welded when applied to welding process;
    means for detecting the output voltage of said secondary winding; and
    means for moving said welding head and said sensor means so as to keep said output voltage at a predetermined value.

2. An automatic weld line copying apparatus according to claim 1, wherein said secondary winding means includes two secondary coils.

3. An automatic weld line copying apparatus according to claim 2, in which said welding head moving means comprises:
    amplifier means to which the output of said secondary winding is applied;
    rectifier means for converting the output of said amplifier circuit into a first DC output;
    logarithm converter means for producing a second DC output whose amplitude is proportional to the logarithm of the amplitude of said first DC output;
    means for comparing said second DC output with a reference voltage produced from a reference voltage setting means and for producing an error signal therefrom; and
    means for controlling the position of said welding head according to said error signal.

4. An automatic weld line copying apparatus according to claim 2, further comprising table means independently movable in both horizontal and vertical directions on which said welding head is mounted, said movable table being mounted on a carriage adapted to freely travel along a rail, and wherein said welding head has two sensors mounted thereon for detecting the displacement of the same during movement in said horizontal and vertical directions, respectively.

5. An automatic weld line copying apparatus according to claim 3, further comprising AC transmitter means with a constant-current characteristic for exciting said primary winding means.

* * * * *